Jan. 27, 1970 R. M. HILMER 3,492,163
COMBINED PRODUCT REMOVAL AND TEMPERATURE CONTROL
SYSTEM FOR FUEL CELLS
Filed May 23, 1966

Inventor
Richard M. Hilmer
By Paul Shapiro
Attorney

United States Patent Office 3,492,163
Patented Jan. 27, 1970

3,492,163
COMBINED PRODUCT REMOVAL AND TEMPERATURE CONTROL SYSTEM FOR FUEL CELLS
Richard M. Hilmer, Brookfield, Wis., assignor to Allis-Chalmers Manufacturing Company, Milwaukee, Wis.
Filed May 23, 1966, Ser. No. 552,249
Int. Cl. H01m 27/02
U.S. Cl. 136—86                                           9 Claims

ABSTRACT OF THE DISCLOSURE

This invention relates to a fuel cell having a system to remove excess reaction products produced at the electrodes, i.e., water vapor, by causing the water vapor to diffuse from the electrodes to a vapor transport membrane provided with a circulating transport liquid in an adjacent cavity. Diffusion of the excess reaction products is cuased by a vapor pressure gradient developed in a series of solutions adjacent the electrodes and vapor pressure membranes. The circulating transport liquid removes the excess reaction products, i.e., $H_2O$ vapor, by conventional means. Seepage of the transport liquid causes an interruption of the vapor pressure gradient and flooding of the electrode. Seepage of the transport liquid in a fuel cell provided with a vapor transport having transport fluid circulated through cavities located within the cell can be prevented by coating the surface of the vapor transport membrane exposed to the cavity where the $H_2O$ vapor is generated with a discontinuous gas permeable but liquid impermeable coating of a water repellant material.

---

Figure 1:
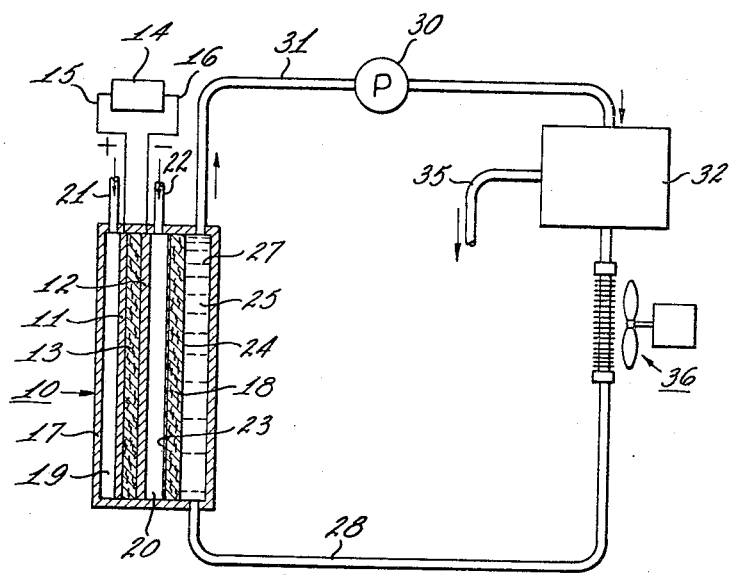

This invention relates to fuel cells and more specifically to a system for exhausting excess reaction products from fuel cells. In particular, this invention relates to the removal of product water and temperature modulation of fuel cells wherein the fuel is hydrogen and the oxidant is oxygen.

The term fuel cell, as used herein, refers to those electrochemical devices that convert the free energy of a chemical reaction directly to electrical energy.

In individual fuel cells, an oxidation half-cell reaction and a reduction half-cell reaction take place at spacially separated electrodes. One electrode, called the anode, is the site of the oxidation half-cell reaction. A reactant, referred to as the fuel, that is oxidizable with respect to some oxidant is supplied to the anode, and is thereat electrochemically oxidized. Oxidation of the fuel releases electrons to the anode. At the other electrode, called the cathode and spaced apart from the anode by a suitable electrolyte, the other half-cell reaction simultaneously takes place. A reactant called the oxidant, reducible with respect to the fuel, is supplied to the cathode, and is thereat electrochemically reduced. This reaction takes up electrons from the cathode.

These two half-cell reactions result in the cathode tending to have a deficiency of electrons and the anode to have an excess. This tendency is relieved by the transfer of charge electronically through an external circuit connecting the electrodes, accompanied by the ionic transfer of charge through electrolyte.

In practice, several individual fuel cells are coupled in cooperative electrical connection to obtain the desired output. A plurality of cells so connected is known as a module.

Production of electrical energy will continue so long as fuel and oxidant are supplied and excess products formed by the electrochemical oxidation-reduction reaction are exhausted.

To illustrate, in hydrogen-oxygen and hydrogen-air fuel cells, water is the oxidation-reduction product. More water is formed at one electrode of this cell than is required for use in the cell reactions. In cells having acid electrolyte, the excess product water forms predominantly at the cathode, while in cells having a basic electrolyte, the excess product water forms predominantly at the anode. This excess product water has heretofore presented a serious problem in continued successful cell operation. If the excess product water is not removed as rapidly as formed, it will build up in the electrolyte and flood the electrode pores. When the electrodes become flooded, cell output decreases, and if flooding is excessive, the cell may fail altogether. Furthermore, if the water is not removed, the electrolyte is progressively diluted until the electrolyte concentration falls below the optimum concentration of the cell. The ionic conductivity decreases, and as ionic conductivity decreases, cell resistance correspondingly increases thereby reducing the efficiency of the cell.

In the past, it has been common to pass the hydrogen or oxygen reactant through the gas space immediately adjacent the anode or cathode to evaporate the excess water produced at the electrode and sweep it from the cell. The water vapor was then condensed from the reactant gas, and the gas recycled. This so-called gas sweep method is dependent on the flow rate of reactant and therefore that flow must be carefully regulated to provide proper water removal. Another method was to replenish the diluted electrolyte with more concentrated electrolyte. Although this method disposed of product water, it did not rectify the problem of electrode flooding.

In a copending patent application to Paul D. Hess, Ser. No. 386,576, filed July 31, 1964, abandoned June 20, 1967, common assignee being the Allis-Chalmers Manufacturing Company of West Allis, Wisconsin there is disclosed a method and system for removing internally generated heat and water from fuel cells wherein the water vapor product produced at the fuel cell electrode diffuses from the electrode and contacts and dissolves in a first solution contained in the first side of a capillary matrix spaced from the electrode. The matrix is saturated with a solution, which has a vapor pressure less than that of water vapor. A second solution having a vapor pressure less than that of the first solution is circulated in a cavity facing the second side of the capillary matrix. The vapor pressure gradient developed between the first solution and the second solution causes water vapor to leave the first solution contained in the capillary matrix and enter into, and be removed from the fuel cell system by the circulating second solution.

The capillary matrix containing the first solution is referred to as a vapor transport membrane and the circulating second solution is referred to as the transport liquid.

The water vapor, after removal from the cell, is separated from the transport liquid by conventional means. The transport liquid can also be passed through a conventional heat transfer means where it is cooled or heated as required to maintain the cell at a proper and uniform operating temperature. The temperature modulated transport liquid now of a reduced excess water vapor content is then recycled through the cell.

Although the above described system is an extremely advantageous method for the removal of heat and water from fuel cells, the system does have the drawback that if during the operation of the fuel cell the pressure of the gaseous fuel or oxidant being delivered to the electrode which is adjacent to the vapor transport membrane falls below the pressure of the transport liquid, the liquid will seep through the membrane and enter the cavity between the electrode and membrane and flood the electrode. Further, during periods of shutdown, the force of gravity will cause some liquid to pass through the membrane and cause additional flooding of the fuel cell electrode.

In accordance with the present invention, seepage of transport liquid in a fuel cell provided with a vapor transport membrane having a transport liquid circulated through cavities located within the cell can be substantially prevented by applying to the surface of the vapor transport membrane exposed to the cavity wherein the product water is generated, a discontinuous, gas-permeable but liquid-impermeable coating of a water repellant material.

The term "discontinuous" is meant to include a porous coating of the water repellant material as well as a coating of very tiny, finely dispersed particles. The water repellant coating applied to the surface of the vapor transport membrane must be discontinuous otherwise the entry of water vapor into the vapor transport membrane would be blocked.

The water repellant material is conveniently applied to the membrane surface in the form of an emulsion which prevents the formation of a continuous coating and provides the membrane with a liquid-impermeable surface which is gas-permeable and permits, due to its porosity, the flow or diffusion of water vapor therein. The surface coating of the membrane may also be a porous film of the water repellant material laminated to the membrane surface.

Emulsion as that term is used herein is intended to define both solid in liquid and liquid in liquid emulsions including aqueous dispersions of colloid size particles such as polytetrafluoroethylene (Teflon 41–BX), polychlorotrifluoroethylene and the like. Also suitable are materials which are inert to any destructive chemical action of electrolyte or reactant such as thermoplastic resins as the polyolefin resins exemplified by polyethylene, polypropylene, and polystyrene, silicones, natural and synthetic waxes. Such materials may either be emulsified finely divided particles in an aqueous dispersion or an aqueous emulsion of a resin dissolved in a suitable solvent, e.g., polystyrene in benzene, and emulsified with a wetting agent such as an alkyaryl polyether alcohol.

The emulsified water repellant material may be applied to the surface of the vapor transport membrane in any convenient manner, as for example, by painting, spraying or dipping the membrane surface with the emulsified water repellant material.

After coating the surface with the emulsified water repellant material, the coated membrane is then dried at a suitable temperature to evaporate the aqueous phase of the dispersion that may be present therein.

The concentration and viscosity of the emulsion applied to the surface of the vapor transport membrane should ordinarily be adjusted so that the membrane is penetrated no more than less than ½ of its thickness.

The vapor transport membrane is a membrane of high capillary potential preferably in excess of 100 lbs./in.$^2$. Asbestos has proven itself to be a preferred vapor transport membrane, although fibrous plastics such as polypropylene or ion exchange membranes are suitable.

The coating of one side of the vapor transport membrane with a discontinuous coating of a water repellant material not only makes that side of the membrane gas-permeable, liquid-impermeable but also materially increases the mechanical strength of the membrane eliminating the need for supporting structures.

Figure 2:
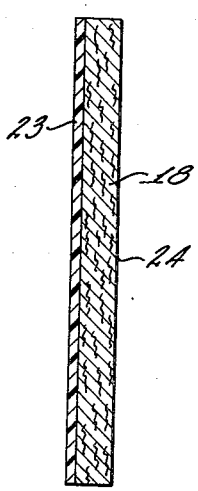

Referring now to the drawings:

FIG. 1 is a schematic view illustrating a capillary membrane hydrogen-oxygen fuel cell having a heat and water removal system embodying the vapor transport membrane of the present invention; and FIG. 2 is a cross-sectional view of the vapor transport membrane of the present invention having one side thereof coated with a water repellant material.

Referring now to FIGS. 1 and 2, fuel cell 10 comprises a pair of gas-permeable electrode members 11 and 12 in direct contact with the opposite surfaces of electrolyte matrix 13 saturated with an aqueous electrolyte and connected to an external load 14 by leads 15, 16. The relative thickness of the electrodes 11, 12 and the matrix 13 as shown in the figure have been exaggerated for the purposes of clarity in the description. Actually in preferred form, the electrodes and matrix may be but a few mils in thickness, the dimension not being critical.

The electrode members 11, 12 can be made of any suitable material but preferred is a porous material such as sintered nickel having a heterogeneous porosity of about 85 percent. If nickel electrodes are used and the cell operated below 300° F., a suitable catalyst to activate the hydrogen (e.g., platinum and palladium) and oxygen (e.g., silver) reactants is used. The electrolyte matrix 13 is preferably a membrane of high capillary potential, higher than either electrode 11 or 12, and preferably in excess of 100 lbs./in.$^2$. The electrolyte matrix 13 can be formed of any suitable fibrous material or other materials exhibiting high capillary potential, asbestos being preferred.

Although a fibrous electrolyte matrix 13 is preferred, the electrolyte can be suitably contained in a single or double wall ion exchange membrane. Furthermore, a free electrolyte system can also be used provided the electrodes 11, 12 are properly waterproofed or otherwise have their pore size controlled to minimize electrode flooding.

The electrode members 11, 12 and electrolyte matrix 13 are supported in outer housing 17.

A vapor transport membrane 18 is positioned adjacent electrode 12, since it is contemplated that water vapor will predominantly form at electrode 12. The housing 17 and the electrode 11 form reactant cavity 19. The electrode 12 and the vapor transport membrane 18 form reactant cavity 20. The fuel cell reactants may be introduced into the reactant cavities 19, 20 through conduits 21, 22. The water vapor formed at electrode 12 will be generated into cavity 20. The major surface 23 of the membrane 18 exposed to the cavity 20 is coated with a water repellant material such as polytetrafluoroethylene. The opposing major surface 24 of the membrane 18 is exposed to chamber 25 which is formed between membrane 18 and the housing 17 and through which a transport liquid is circulated.

During assembly of the cell, the electrolyte matrix 13 is saturated with electrolyte, such as an aqueous solution of alkali hydroxide, for example, potassium hydroxide having a concentration of between 30–38 percent potassium hydroxide by weight. It is to be understood that performance of this invention is not limited to this range or this electrolyte. The volume of electrolyte is predetermined so that when the cell is assembled and electrolyte matrix 13 is compressed into adherent contact with the porous electrodes 11 and 12, some of the electrolyte is forced from the membrane into contact with the electrodes 11, 12. The electrolyte, however, does not completely saturate the electrodes, but does penetrate about ⅓ of the way into the porous electrode structure to form what are known as electrolyte fronts or reaction boundary interfaces. It is at these interfaces that the electrochemical reactions of the cell occur. The remainder of the space within the electrodes 11, 12 provides a reservoir for the storage of diluted electrolyte during cell operation.

The vapor transport membrane 18 is initially saturated with solution comprising a solvent and a nonvolatile solute. The solvent of this solution must be identical to the excess product to be removed from the cell. Thus, my invention can be used where the oxidation-reduction reaction involves reactants other than hydrogen and oxygen. When other reactants are used, it is required that the reactant fed to cavity 20 be gaseous. The reactant fed to cavity 19 may be a gas or a liquid.

Since the excess product to be removed from this embodiment is water, the solvent of the solution with which the membrane is saturated is also water. As shall appear later, any nonvolatile solute which sufficiently depresses the vapor pressure of the solvent in the membrane 18 can comprise the solute of this solution. In the embodiment shown, the vapor transport membrane 18 is conveniently saturated with a potassium hydroxide solution at a concentration of about 2–3 percent greater by weight than the potassium hydroxide concentration in the electrolyte matrix 13. The exact concentration of the potassium hydroxide solution supplied to vapor transport membrane 18 is not critical because the relative concentrations of the solutions in electrolyte matrix 13 and vapor transport membrane 18 are self-adjusting during operation. Of course, the concentration cannot be so different from the electrolyte as to disturb the preferred volume of solution in electrolyte matrix 13.

In the embodiment shown wherein a basic electrolyte such as KOH is contained in capillary matrix 13, fuel, which may be for example hydrogen, is introduced into the cavity 20 via conduit 22 and the oxidant, which may be for example pure oxygen or any oxygen containing gas such as air, is introduced into the cavity 19 via conduit 21. Water vapor which is the fuel cell reaction product is produced at the hydrogen electrode and is generated into the cavity 20.

It is to be noted that during cell operation, the capillarly pores of electrolyte matrix 13 and vapor transport membrane 18 must be substantially filled with solution. If the electrolyte matrix 13 is not so filled, the oxygen or hydrogen gas pressure in the respective gas cavities 19 and 20 could exceed the capillary pressure thereby allowing oxygen or hydrogen to penetrate electrolyte matrix 13. This would allow the reactants to commingle causing chemical short circuiting of the individual cell accompanied by its overheating. Likewise, if the vapor transport membrane 18 is not substantially filled with potassium hydroxide solution, the reactant gas pressure in cavity 20 could exceed the capillary pressure of membrane 18 and escape through membrane 18 into chamber 25 thence into the transport liquid.

To initiate reaction when an external load circuit is connected, hydrogen and oxygen are consumed by the cell. Oxygen is fed through the conduit 21 into cavity 19. The oxygen diffuses through the pores of electrode 11 until it reaches the reaction boundary interface. There the oxygen is activated so that it reacts with water and electrons from the external circuit and is electrochemically reduced to hydroxyl ions according to the formula,

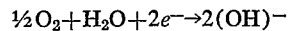

At the same time, hydrogen is fed through the conduit 22 into cavity 20, and diffuses through the pores of electrode 12 until it reaches the reaction boundary in the electrode. There hydrogen reacts with hydroxyl ions and is electrochemically oxidized to water, releasing electrons to the external circuit according to the formula,

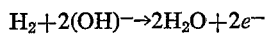

For every mole of hydrogen oxidized, two moles of water are formed at electrode 12. One mole of this water migrates into electrolyte matrix 13 to replenish the water from the electrolyte used to reduce oxygen. The other mole of water is excess product. In both of these reactions, heat is also produced. The water removal process to be described removes much of this heat from the cell.

A portion of the water produced at electrode 12 is vaporized. The amount of water vaporized, of course, depends on the temperature of the cell and the electrolyte concentration at the reaction interface. The remaining water produced enters the electrolyte matrix 13 and tends to reduce the concentration of the electrolyte in the region of the fuel electrode reaction boundary interface. Since water is used in the oxidant electrode reaction, the electrolyte tends to become more concentrated in potassium hydroxide at the region of oxidant electrode reaction boundary interface. As a consequence of cell operation, a concentration gradient differing from the equilibrium conditions forms in electrolyte matrix 13. Thus, the diluted electrolyte concentration $C_2$ at the fuel electrode reaction boundary interface is less than the electrolyte concentration $C_1$ at the oxidant electrode reaction boundary interface. For example, the original electrolyte concentration in electrolyte matrix 13 may be 34 percent KOH by weight. After some operation, the concentration in the region of the fuel electrode reaction boundary interface may be reduced from the equilibrium concentration to 32 percent, and in the region of the reaction boundary interface at the oxidant electrode may be raised to 36 percent. Thus, a concentration gradient exists through electrolyte matrix 13 from 36 percent to 32 percent KOH. The vapor pressures exerted by these solutions will be the converse of their concentrations. Thus, the vapor pressure of the electrolyte solution at the oxidant electrode $P_1$ is less than the vapor pressure of the diluted electrolyte solution at the fuel cell electrode $P_2$.

The solution contained at the membrane 18 is adjusted to have a concentration of KOH $C_3$ greater than $C_2$ and the corresponding vapor pressure $P_3$ exerted by the solution $C_3$ contained in the membrane 18 is less than $p_2$. The water vapor product at pressure $p_2$ diffusing from the fuel electrode into the cavity 20 preferentially seeks to reach equilibrium with the solution of lower water vapor pressure contained at the surface 23 of membrane 18. The water vapor generated at the fuel electrode then diffuses through the porous coated surface 23 of the membrane 18 and is thereby caused to enter the membrane 18. The water vapor entering membrane 18 dilutes the KOH solution contained in a region of the membrane near the surface facing the cavity 20. If this dilution were to continue to the point where the concentration $C_3$ equaled the electrolyte concentration $c_2$ at the fuel electrode, the vapor pressures $p_2$ and $p_3$ would also then be equal and the water vapor would not diffuse selectively into the membrane 18.

Formation of an equilibrium state is, however, prevented by circulating a transport liquid 27 through line 28 into cavity 25. The transport liquid is a liquid whose vapor pressure $p_5$ is maintained at a level less than the vapor pressure $p_4$ exerted by the KOH solution contained at the surface 24 of the vapor transport membrane facing the cavity 25. In this manner, water vapor is caused to continuously leave the surface 24 and enter into the liquid 27. Thus, the vapor pressure relationship between the water vapor product, the solution contained on the vapor transport membrane and the vapor transport liquid circulated adjacent thereto provides the driving force to progressively move the fuel cell water vapor product away from the fuel electrode into the transport membrane 18, thence into the transport fluid 27 and ultimately out of the cell.

The transport liquid 27 is comprised of a solution of a nonvolatile solute and a solvent common to the excess product to be removed from the cell having a concentration $C_4$ greater than $C_2$ and preferably greater than $C_3$. The transport liquid preferably contains a solute common to the solute of the solution contained in membrane 18.

The transport liquid 27 circulated by pumping means 30 leaves the cell through line 31 and enters a conditioner 32 where the excess product is separated from liquid 27 by conventional means. After removal from liquid 27, the excess product is flushed through outlet 35 for disposal.

Transport liquid 27 is next passed through a conventional heat transfer means 36 where the liquid temperature is modulated as desired.

A hydrogen-oxygen cell of the type illustrated in FIG. 1 was constructed incorporating a vapor transport membrane prepared in accordance with the present invention and of the type illustrated in FIG. 2.

The cell had an area of 0.25 ft.² A porous silver electrode was used as the oxidant electrode and a platinum/palladium catalyzed sintered porous nickel electrode was used as the fuel electrode. The cell was operated at a temperature of 110° C. The reactants were supplied at a pressure of 18 lbs./in.² gauge. The electrolyte matrix 13 was comprised on an asbestos membrane 0.030 inch thick saturated with a 30 percent KOH solution.

The vapor transport membrane 18 was an asbestos membrane 0.030 inch thick which was sprayed on one side with an aqueous dispersion of polytetrafluoroethylene, sold under the tradename "Teflon 41–BX" (containing approximately 35 percent solids). The asbestos absorbed the liquid out of the suspension, leaving a discontinuous film of polytetrafluoroethylene on the sprayed side. The coated asbestos was then heated to about 350–380° C., i.e., to approximately the sintering temperature of the polytetrafluoroethylene solution for about 5 minutes. The polytetrafluoroethylene coating penetrated the asbestos surface to a depth less than .005 inch.

The asbestos membrane was then mounted in the cell with the coated side facing the hydrogen electrode.

The transport liquid was a 35 percent KOH solution which was circulated at the rate of about 500 cc./min. in cavity 25 opposite the uncoated side of the asbestos membrane. Excess water was removed from the transport liquid at the rate of 16.8 ml./hr.

The cell was operated for 1500 hours and delivered 56,250 kw. h. of electrical energy. During the entire run, no seepage of transport liquid was noted in the cavity 20 between the hydrogen electrode and the vapor transport membrane.

The embodiments of the invention in which an exclusive property or privilege is claimed are defined as follows:

1. A system for producing electrical power and exhausting reaction products from fuel cells comprising: a fuel cell having a housing means enclosing at least first and second electrodes spaced by an electrolyte containment means; means for supplying a fuel gas to a first electrode and oxidant gas to a second electrode; a vapor transport membrane mounted in spaced relation between said first electrode and said housing means; a first side of said membrane defining with said first electrode a gas reactant cavity; the surface of said first membrane side having thereon a discontinuous, gas-permeable, liquid-impermeable coating of a water repellant material; the second side of said membrane defining with said housing means a product removal cavity; said product removal cavity having an inlet and an outlet; and means for passing a product transport liquid through the inlets and outlets of the product removal cavity.

2. The system of claim 1 wherein the first electrode is the fuel electrode.

3. The system of claim 1 wherein the vapor transport membrane is comprised of asbestos.

4. The system of claim 1 wherein the first side of the vapor transport membrane has applied thereto a discontinuous coating of a thermoplastic resin.

5. The system of claim 1 wherein the first side of the vapor transport membrane has applied thereto a discontinuous coating of polytetrafluoroethylene.

6. The system of claim 1 wherein the fuel cell is an hydrogen-oxygen fuel cell.

7. The system of claim 1 wherein the vapor transport membrane is saturated with a solution comprising a nonvolatile solute in a concentration such that the vapor pressure of the product produced by the fuel cell exceeds the vapor pressure of the solution contained within the vapor transport membrane and the product transport liquid is a liquid solution of a nonvolatile solute and a solvent common to both said product and the solvent in said membrane, said solute present in a concentration such that the vapor pressure of the solution contained in the membrane exceeds the vapor pressure of the liquid.

8. A system according to claim 1 wherein the fuel cell reaction product is water.

9. A system according to claim 1 wherein the solution contained in the vapor transport membrane and the product transport liquid is an aqueous solution of potassium hydroxide.

References Cited

UNITED STATES PATENTS

| 3,061,658 | 10/1962 | Blackmer | 136—86 |
| 3,098,772 | 7/1963 | Taschek | 136—86 |
| 3,172,784 | 3/1965 | Blackmer | 136—86 |
| 3,370,984 | 2/1968 | Platner | 136—86 |

WINSTON A. DOUGLAS, Primary Examiner

P. D. ROSENBERG, Assistant Examiner

U.S. Cl. X.R.

136—86